US007256730B2

(12) United States Patent
Hernandez-Pajares et al.

(10) Patent No.: US 7,256,730 B2
(45) Date of Patent: Aug. 14, 2007

(54) METHOD AND SYSTEM FOR REAL TIME NAVIGATION USING SATELLITE TRANSMITTED THREE-CARRIER RADIO SIGNALS AND IONOSPHERIC CORRECTIONS

(75) Inventors: Manuel Hernandez-Pajares, Barcelone (ES); Jose Miguel Juan-Zornoza, Barcelone (ES); Juame Sanz-Subirana, Barcelone (ES); Alberto Garcia-Rodriguez, Abbenes (NL)

(73) Assignee: Organisation Intergouvernementale Dite Agence Spatiale Europeenne, Paris (FR)

( * ) Notice: Subject to any disclaimer, the term of this patent is extended or adjusted under 35 U.S.C. 154(b) by 0 days.

(21) Appl. No.: 10/539,826

(22) PCT Filed: Dec. 16, 2003

(86) PCT No.: PCT/FR03/50176

§ 371 (c)(1),
(2), (4) Date: Mar. 16, 2006

(87) PCT Pub. No.: WO2004/057364

PCT Pub. Date: Jul. 8, 2004

(65) Prior Publication Data

US 2006/0164297 A1    Jul. 27, 2006

(30) Foreign Application Priority Data

Dec. 19, 2002    (FR) .................................. 02 16227

(51) Int. Cl.
*G01S 5/14* (2006.01)

(52) U.S. Cl. .............................. 342/357.03; 342/357.04
(58) Field of Classification Search ........... 342/357.01, 342/357.03, 357.04, 357.12; 701/207, 215
See application file for complete search history.

(56) References Cited

U.S. PATENT DOCUMENTS

| 5,805,108 | A | 9/1998 | Lennen |
| 6,356,232 | B1 | 3/2002 | Rocken et al. |
| 2003/0058162 | A1* | 3/2003 | Sirola et al. ........... 342/357.04 |
| 2004/0130485 | A1* | 7/2004 | Rapoport et al. ....... 342/357.03 |
| 2005/0203702 | A1* | 9/2005 | Sharpe et al. ................ 701/213 |

OTHER PUBLICATIONS

Impact of real-time ionospheric determination on improving precise navigation with GALILEO and next generation GPS, Hernandez-Pajares, et al., Proceedings Ion, (Jan. 2003).
Tomographic modeling of GNSS ionospheric corrections, Hernandez-Pajares, Proceedings of the Ion GPS (Sep. 2001).
Improving the real-time ionospheric determination form GPS sites at very long distances over the equator, Hernandez-Pajares, Journal of Geophysical Research. (Oct. 2002).
Optimization of Cascade Integer Resolution with Three Civil GPS Frequencies, Jung. Institute of Navigation, (Sep. 2000).
Analysis of three-carrier ambiguity resolution technique for precise relative positioning in GNSS-2, Vollath, et al. Navigation. Journal of the Institute of Navigation, (Apr. 1999).

* cited by examiner

*Primary Examiner*—Dao L. Phan
(74) *Attorney, Agent, or Firm*—Fulbright & Jaworski LLP

(57) ABSTRACT

The invention concerns a real-time navigation method for locating a rover using three-carrier radio signals of three different frequencies to determine the position of a user, transmitted by satellites. The method comprises a first step for determining "extra-wide lane" carrier phase ambiguity, a second step for estimating "wide-lane" phase ambiguity, and a third step for resolving the phase ambiguity of one of the frequencies. An additional step consists in the application of real-time ionospheric corrections during the third step, these ionospheric corrections being based on a continuously updated ionospheric model of said ionospheric layer calculated by a fixed ground reference station combined with geodetic data calculated by a so-called master fixed ground reference station. The invention also concerns a system for implementing the method.

9 Claims, 8 Drawing Sheets

METHOD AND SYSTEM FOR REAL TIME NAVIGATION USING SATELLITE TRANSMITTED THREE-CARRIER RADIO SIGNALS AND IONOSPHERIC CORRECTIONS

This application is a §371 from PCT/FR2003/050176 filed Dec. 16, 2003, which claims priority from FR 0216227 filed Dec. 19, 2002, each herein incorporated by reference.

BACKGROUND OF THE INVENTION

The invention concerns a method and a system for real-time navigation using satellite-transmitted three-carrier radio signals and ionospheric corrections, more precisely corrections obtained by means of a continuously updated real-time ionospheric model, the model being based on data from a satellite navigation system, for example implemented like a three-dimensional voxel model.

It is particularly though not exclusively, applicable to the field of high-precision instantaneous navigation, typically having a precision within one decimeter, as will be shown below, at distances on the order of hundreds of kilometers or more.

By way of illustration, we will hereinafter focus on the preferred application of the invention, without in any way limiting its scope.

One of the current commonly used techniques for obtaining a precise positioning of an "object," whether stationary or moving, and in the latter case, data relative to its position, its movement, the direction of this movement and/or its speed, is to use radio signals transmitted by artificial satellites orbiting around the earth. The term "object" should be understood in its most general sense, notably a land, sea or air vehicle. For simplicity's sake, we will hereinafter refer to this "object" as a "rover."

There are various known techniques for obtaining the aforementioned positioning. They are based in particular on the knowledge of the instantaneous position of several satellites in space (or a constellation of satellites, as these satellites may or may not be geostationary) and of the propagation speed of the radio waves. High-precision clocks are installed aboard the satellites, and the transmitted signals include time-stamped information, which makes it possible to know precisely the moment of both transmission and reception. It is thus possible to determine the theoretical distance separating a satellite in view of the rover from the latter at a given moment, knowing the propagation speed of the waves and the time they take to reach the rover. If a sufficient number of satellites is observable, it is thus possible to determine the coordinates of the rover relative to a reference frame, in two dimensions (longitude and latitude on the earth) or even three dimensions (longitude, latitude and altitude/vertical).

However, as will be shown, because of the accumulation of errors in the measurements due to various causes, the distances calculated are only approximate, and the determination of the position of the rover suffers from a more or less substantial degree of imprecision, depending on the technologies used.

One of the best known satellite navigation systems is the system known as "GPS" for "Global Positioning System."

Customarily, "GPS" (or similar system) satellites transmit in two frequency bands, generally designated $L_1$ (a carrier frequency equal to 1.575 GHz) and $L_2$ (a carrier frequency equal to 1.227 GHz), hence the adjective "dual frequency" that is applied to them.

The use of these two frequencies, in accordance with certain methods well known to one skilled in the art, makes it possible to improve the precision of the determination of a rover's position relative to a reference frame, but it requires "GPS" receivers that are more complex and more costly.

A position determination can be made using two main methods: real-time, or after-the-fact, by performing what is known as a "post-processing." The first case is commonly referred to as "single-epoch" resolution (a term that will be used below) or instantaneous resolution, the calculations being performed during a single observation "epoch." The second method ("post-processing") makes it possible to improve precision. However, while the latter method does not present any major drawbacks for slow-moving rovers (ships, for example), it is not appropriate for rovers that move very fast (aircraft, for example).

Precision can be further improved by combining the signals transmitted by the satellites with signals originating from fixed ground reference stations whose positions are well known. However, if the rover travels great distances, it is necessary for this network of stations to be relatively dense, especially in cases where high precision is desirable in the determination of the rover's position, which correspondingly increases the cost of the global system.

Moreover, among the numerous causes of errors, differential ionospheric refraction, when considering distances equal to tens of kilometers or more, is one of the main problems affecting capacities for instantaneous resolution of carrier phase ambiguity, and consequently the capability to provide a navigation wherein the precision is on the order of one centimeter with dual-frequency global navigation satellite systems such as the aforementioned "GPS" system. This characteristic will remain true with respect to future three-frequency systems like the "GALILEO" system and the "Modernized GPS" system.

In essence, the three-carrier systems currently being planned offer the potential advantages of a high success rate and high integrity in instantaneous ambiguity resolution, with a minimal number of geodetic calculations. This is particularly due to the fact that a higher quantity of different data (i.e., associated with the aforementioned three frequencies) is made available, which correspondingly improves the chances of obtaining an instantaneous ("single epoch") ambiguity resolution.

But here again, this resolution can be seriously affected by ionospheric refraction, as explained below.

In order to achieve high precision in the instantaneous determination of the position of a rover, particularly a rover that travels great distances, there is still a need to implement techniques that make it possible, in particular, to reduce the harmful influence of ionospheric refraction.

In the prior art, various methods for meeting this need have been proposed.

For example, there is the method known as "TCAR," for "three-carrier ambiguity resolution." This method is described in the article entitled "ANALYSIS OF THREE-CARRIER AMBIGUITY RESOLUTION (TCAR) TECHNIQUE FOR PRECISE RELATIVE POSITIONING IN GNSS-2," by U. VOLLATH et al., published in "Proceedings of the ION GPS" 1998, IX-O-13, pages 1–6.

There is also the method known as "CIR," for "cascade integer resolution." This method is described in the article by Jaewo JUNG et al., entitled "Optimization of Cascade Integer Resolution with Three Civil GPS Frequencies," published in "Proceedings of the ION GPS 2000."

These two techniques share a similar basic approach: the double difference ambiguities of integers are successively resolved by calculating wave frequency beats. This calculation is performed from the longest to the shortest beat wavelength, including combinations of so-called "wide" lane and "extra wide" lane carrier phases (with wavelengths of 7.480 m and 0.862 m, respectively), and a first carrier at the "$L_1$ frequency" (with a wavelength of 0.190 m).

The "TCAR" method in particular constitutes a simple approach that tries to resolve the full set of ambiguities instantaneously (in "single epoch" mode). But the performance of "TCAR" is strongly affected by the ionospheric refraction decorrelation that occurs with distance. In fact, as explained below, ionospheric delay is a problem when (as in the case of two-frequency systems) the value of its double differential is more than 0.26 TECU (which corresponds to a 4-cm delay for $L_1$).

A "TECU" is a unit used to describe certain electrical characteristics of the ionosphere. In essence, the ionosphere can be described using a map that represents a count of the total number of electrons, or "TEC" (for "Total Electron Content"). The map represents the integration of the number of electrons in a vertical direction as a function of latitude and longitude. A unit of TEC is referred to as a "TECU" (for "TEC Unit"), with one $TECU=10^{16}$ electrons contained in a cylinder aligned on the line of observation of an observed satellite, the cross-section of which is 1 $m^2$. The charged particles in the ionosphere are generated by the sun, whose radiation intensity varies naturally as a function of the time in question. Because the earth rotates on its axis underneath the ionospheric layer, the "TEC" map is normally considered to represent a reference frame that is fixed relative to the sun, but that changes as a function of time.

The above-mentioned threshold is easily exceeded, as may be seen by consulting ionospheric ("TEC") maps of vertical delays calculated from "GPS" data. Such maps are issued, for example, by the "Jet Propulsion Laboratory," the University of Bern, etc., and published on the Internet by the "University Corporation for Atmospheric Research" and other similar organizations.

Consequently, in order to further improve the "TCAR" method, an integrated approach known as "ITCAR" (for "Integrated TCAR") was developed. This technique is described, for example, in the above-mentioned article by VOLLATH et al.

This technique uses search algorithms and a navigation filter wherein the ambiguities are part of the output signals and the residual ionospheric errors are roughly estimated. For a more detailed description of the techniques used, it would be worthwhile to refer to this article.

However, although it provides a significant improvement, the "ITCAR" technique is nonetheless still affected by the lack of knowledge of the double difference of the ionospheric refraction, thus limiting the success rate of the ambiguity resolution for distances greater than several tens of kilometers, as described in the article by VOLLATH et al., entitled "Ambiguity Resolution Using Three Carriers—Performance Analyzing Using 'Real' Data, published in "GNSS Symposium," Seville, May 2001.

It has also been proposed, again with a view to improving the precision of the determination of a rover's position relative to a reference frame, to combine a real-time ionospheric model of the ionosphere, obtained from "dual-frequency" data generated by a network of fixed stations, with data from a geodetic program, and to use such data to perform ionospheric corrections. This method has been used with some success in resolving ambiguities in real-time in two-frequency systems of the "GPS" type.

One method of this type, called "WARTK" (for "Wide Area Real-Time Kinematics"), is described for example in the article by Hernández-Pajares et al. entitled "Tomographic Modeling of GNSS Ionospheric Corrections: Assessment and Real-Time Applications," published in "ION GPS" 19–22 Sep. 2000, pages 616–625. This method does make it possible to attenuate the harmful effects of the disturbances experienced by the radio waves propagating in the ionosphere, and consequently, to substantially improve the success rate of the phase ambiguity resolution and the determination of a rover's position relative to a reference frame, but it requires a large number of calculations to produce the aforementioned model in real time and to determine, also in real time, the ionospheric corrections to be applied to the distance measurements.

SUMMARY OF THE INVENTION

The invention seeks to overcome the drawbacks of the methods and systems of the prior art, some of which have been mentioned.

The object of the invention is to provide a method for high-precision real-time navigation (a determination of the position of a rover typically better than one decimeter) using three-carrier radio signals transmitted by satellites and ionospheric corrections obtained from data in an ionospheric model describing a region passed through by the radio radiation, combined with geodetic data.

To this end, according to a first important characteristic of the invention, a simple method for the instantaneous ("single epoch") resolution of the ambiguities of satellite-transmitted three-carrier phases, of the aforementioned "TCAR" type, is used. Precise real-time ionospheric corrections, based on a descriptive ionospheric model, are generated by fixed reference stations. These ionospheric corrections are transmitted to users that incorporate them into "TCAR."

The invention has three important advantages.

The capabilities specific to the invention make it possible to obtain better performance than the "ITCAR" method over long distances, at a position very far from the nearest reference station. The method according to the invention typically allows the instantaneous resolution of more than 90% of ambiguities at more than 100 kilometers from this station, and practically 100% at a distance on the order of 60 km, even in an operating scenario that is not very favorable: low ionospheric values and maximum sunlight conditions. Under comparable conditions, the methods of the prior art using three frequencies achieve a typical success rate that is only on the order of 60%.

It is easy to see that this latter characteristic is very advantageous, since it does not require the installation of a very dense network of fixed ground reference stations (stations on the order of a hundred kilometers apart). The result is a very substantial overall savings, for example in the case of Europe: in covering that continent, it is possible to reduce the number of reference stations by 99% compared to a network wherein the reference stations are only separated by a distance on the order of ten kilometers, while retaining the same precision in the determination of a rover's position as that obtained by the methods of the prior art. This is in fact the installation density required to obtain a navigation precision better than one decimeter, as sought by method of the invention in its preferred application. Moreover, the network of fixed ground reference stations required by the method of the invention is very similar to the network currently being installed for the European satellite navigation system known by the abbreviation "EGNOS GNSS" (for "European Geostationary Navigation Overlay System—Global Navigation Satellite Systems"). This system is based on a constellation of "IMMERSAT III" satellites, which suggests that there is substantial compatibility with the installations that currently exist or are in the process of being installed.

Nevertheless, the method according to the invention is still quite simple, like the "TCAR" method. In particular, it requires only a small number of calculations for the user (the rover's receiver) compared to the "ITCAR" and "WARTK" methods, which were developed for two-frequency positioning systems, as explained above.

Furthermore, the descriptive real-time ionospheric model of the region passed through by the radio radiation transmitted by the observed satellites uses only carrier phase data, this data being combined with geodetic estimates calculated at a single center, which can be one of the stations, in the reference station network, called a "master" station.

Hence, the primary subject of the invention is a method for real-time navigation using three-carrier radio signals of first, second and third different frequencies that increase in value from said first to said third frequency, to determine the position of a user, called a rover, said radio signals being transmitted by a given number of transmitters installed aboard satellites orbiting around the earth and in view of said rover, said signals being received by a receiver associated with said rover and a receiver associated with at least one ground station among a plurality of fixed ground stations called reference stations, said radio signals passing through a so-called ionospheric layer of the atmosphere surrounding said earth and experiencing disturbances that generate phase ambiguities in said carriers, characterized in that it comprises at least the following steps:

a first step consisting in the determination, in said rover, of the so-called "extra-wide lane" ambiguity of the phase differences between said third and second carriers, from a combination of pseudoranges using a single code value;
   a second step consisting in the estimation, in said rover, of the so-called "wide lane" ambiguity of the phase differences between said first and second carriers, from said "extra-wide lane" ambiguity determined during said first step;
   a third step consisting, in said rover, in the resolution of the ambiguity of one of said frequencies, from said "wide lane" ambiguity estimated during said second step; and
   an additional step for applying real-time ionospheric corrections during said third step, said ionospheric corrections being based on a continuously updated real-time ionospheric model of said layer.

Another object of the invention is a satellite navigation system that implements this method.

BRIEF DESCRIPTION OF THE FIGURES

The invention will now be described in greater detail in reference to the attached drawings, among which.

DETAILED DESCRIPTION OF THE INVENTION

Figure 1A:
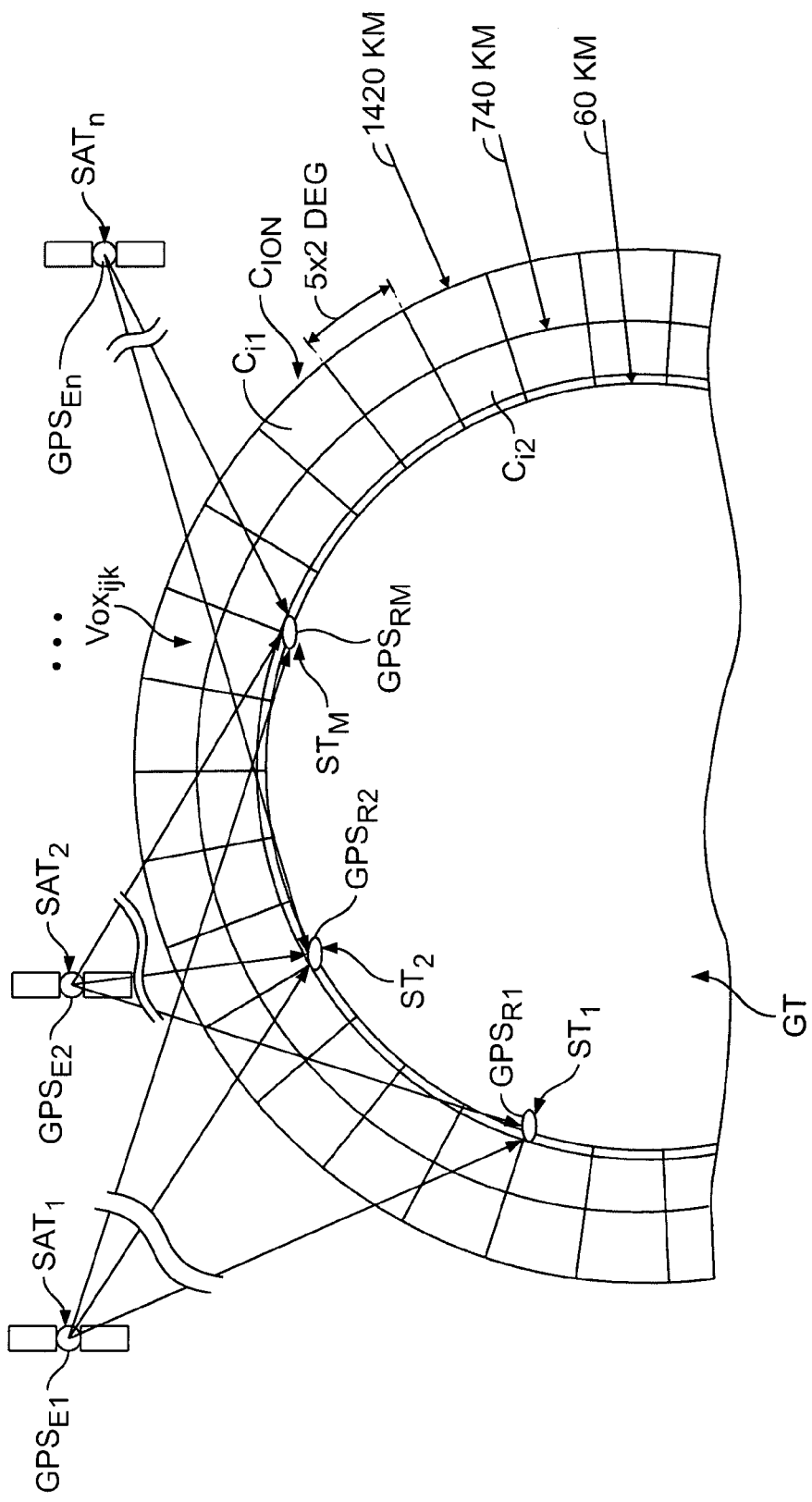
FIG. 1A schematically illustrates a partial cross-section of the earth, and of the ionospheric layer that surrounds it, cut into voxels, as well as radio beams generated by "GPS" transmitters on three communication satellites, and three ground stations receiving these signals.

Hereinafter, without in any way limiting the scope of the invention, we will focus on the context of its preferred application unless otherwise indicated, i.e., on the case of a high-precision satellite navigation method using three-carrier radio waves of different frequencies transmitted by satellites, and real-time corrections derived from a descriptive real-time ionospheric model of a region sounded by radio frequency radiation from satellites.

We will now describe the main steps of the method according to the invention in detail, using typical numeric values to illustrate them. It comprises three basic steps, which are similar to those of the aforementioned "TCAR" method and are explained below:

Step 1:

In order to resolve the so-called "extra wide lane" ambiguity (with a typical wave-length of 7.5 meters in a data set of a given exemplary experiment), a combination of codes known as "pseudoranges" is added.

Among the known causes of errors is the so-called "multipath" phenomenon. Although pseudorange multipaths can reduce the success rate, this error is generally of low amplitude compared to the long wavelength of the "extra-wide lane," and it is usually possible to overcome this problem.

In fact, the first step typical of the "TCAR" approach (see for example the above-mentioned article by VOLLATH et al., from 1998) is to estimate the double difference of the ambiguity (between satellite-receiver pairs), hereinafter called $\nabla\Delta N_{ew}$, from the double difference of "extra-wide" lane carrier phases, hereinafter called $\nabla\Delta L_{ew}$, ($L_{ew}$ being the wavelength of the "extra-wide" lane carrier), using a combination of "pseudoranges" (or codes) $P_{ew}$ that share the same ionospheric dependence value and sign as the phase combinations. This is possible given the long wavelength resulting from the "extra-wide lane" combination. The values of $L_{ew}$ and $P_{ew}$ can be determined by the following equations:

$$L_{ew} = \lambda_{ew}(\phi_3 - \phi_1) = \frac{f_3 L_3 - f_1 L_1}{f_3 - f_1} = \rho* + \lambda_{ew} b_{ew} + \alpha_{ew} I + m_{ew} + \varepsilon_{ew} + \ldots \quad (1)$$

$$P_{ew} = \frac{f_3 P_3 + f_1 P_1}{f_3 + f_1} = \rho* + \alpha_{ew} I + M_{ew} + E_{ew} + \ldots \, ; \quad (2)$$

equations in which $L_x$ is the carrier phase observation (in units of length) with the frequency $f_x$ and with the wavelength $\lambda_x$. The values of X are shown in the attached TABLE I at the end of the present specification, it being understood that the numbers 1 through 3 are associated with the three frequencies in the example described. TABLE I groups together a certain amount of associated data: frequencies, wavelengths, ionospheric dependence and maximum multipath errors, and various observations that are useful for a good understanding of the method according to the invention. This data is associated with the three frequency bands $L_1$ through $L_3$, respectively, and with the "extra-wide" and "wide" lane carrier phases ($L_{ew}$ and $L_w$), respectively. $P_x$ is the corresponding "pseudorange" observation. The multipath and observation errors for carrier phases and "pseudoranges" are marked $m_x$, $M_x$, $\epsilon_x$, and $E_x$, respectively (the maximum multipath values and the typical measurement errors are also listed in Table I). The undifferentiated carrier phase ambiguity $\lambda_x b_x$, which contains instrumental delays and, after double differentiation, becomes a multiplication integer value of the wavelength $\lambda_x \nabla \Delta N_x$. The ionospheric delay $\alpha_x I$ is proportional to the "Slant Total Electron Content," or "STEC," the integration of the free electron density along the beam radiated by a satellite normally being measured in TECU, as mentioned above. In equations (1) and (2), $\rho*$ represents a term that does not depend on the frequency (distance, clock errors, tropospheric refraction, etc.).

From equation (2), in which additional minor terms such as carrier phase wind-up are not explicitly represented, it is possible to estimate the double difference of "extra-wide" lane ambiguity, hereinafter called $\nabla \Delta \hat{N}_{ew}$, in a single observation "epoch" by subtracting the corresponding code, as expressed in the equation below:

$$\nabla \Delta \hat{N}_{ew} = \quad (3)$$
$$\frac{1}{\lambda_{ew}} \nabla \Delta (L_{ew} - P_{ew}) = \nabla \Delta N_{ew} - \frac{1}{\lambda_{ew}} (\nabla \Delta M_{ew} + \nabla \Delta E_{ew}) + \ldots \, ;$$

When there are no substantial multipaths affecting the receivers (usually less than 3.7 meters), the error limit of such an evaluation is less than 0.5 cycles (as shown by the values provided in TABLE I), which makes it possible to instantaneously determine the ambiguity to an exact integer value.

Step 2:

The combination "wide lane" ambiguity is estimated from the unambiguous "extra-wide lane" carrier phase obtained during the first step. Most of the time, the difference between the two is constituted by the "extra-wide lane" ambiguity and the differential ionospheric refraction (approximately 0.06 cycles/TECU with the working frequencies of the present example). The nondispersive terms are eliminated. The main problems here are the measurement error and the multipaths of the carrier phase signals. Although the typical values of the differential ionospheric refraction at middle latitudes and with baselines of less than 100 kilometers are just a few TECU, the use of the ionospheric correction can significantly increase the success rate at greater distances, and in more difficult ionospheric scenarios.

The main details of this step will now be explained.

Once the first "long wavelength" ambiguities $\nabla \Delta N_{ew}$ are resolved using the corresponding "pseudoranges," a second ambiguity such as the "wide lane" combination $L_w$ expressed by the following equation:

$$L_w = \lambda_w (\phi_1 - \phi_2) = \frac{f_1 L_1 - f_2 L_2}{f_1 - f_2} = \rho* + \lambda_w b_w + \alpha_w I + m_w + \varepsilon_w + \ldots \, ; \quad (4)$$

(an equation in which $\phi_1$ and $\phi_2$ are the phases with the frequencies $L_1$ and $L_2$), can be estimated from $\nabla \Delta N_{ew}$ and from the corresponding difference of the carrier phases (see the corresponding constant values in TABLE I), in accordance with the equation:

$$\nabla \Delta \hat{N}_w = \frac{\nabla \Delta L_w - \nabla \Delta L_{ew} + \lambda_{ew} \nabla \Delta N_{ew}}{\lambda_w} = \quad (5)$$
$$\nabla \Delta N_w = \frac{1}{\lambda_w} \nabla \Delta (\varepsilon_{ew} + m_{ew} - m_w) + \frac{1}{\lambda_{ew}} (\alpha_w - \alpha_{ew}) \nabla \Delta I;$$

In essence, in the presence of moderate multipaths, the error term corresponding to equation (5), which also includes the observation error, is normally less than 0.3 meters, i.e., less than 0.4 cycles. The error term remaining from the ambiguity resolution corresponds to ionospheric refraction at a value of 0.0580 cycles/TECU for the frequencies in the example (see TABLE I). This term may lower the success rate, but it is not a critical term at middle latitudes and at distances of less than a few hundred kilometers, for which the double differences of the "STEC" values, hereinafter called $\nabla \Delta I$, are generally less than 10 TECU. A detailed example will be given below in reference to the diagram in FIG. 5.

It is in such a context that the use of a real-time ionospheric model improves the conditions for the success of "extra-wide lane" ambiguity resolution at lower latitudes and for scenarios with longer lines.

Step 3:

The $L_1$ phase ambiguity is derived from the difference between $L_1$ and the unambiguous "extra-wide lane" obtained previously. In this step, the main problem is the corresponding differential ionospheric refraction (approximately 1.9 cycles/TECU), which can produce errors of several cycles at middle latitudes.

In the third step, an approach similar to the second step is implemented, but using the carrier phase differences between short and medium wavelengths instead of medium and long wavelengths, as is clear from the following equation (6):

$$\nabla \Delta \hat{N}_1 = \frac{1}{\lambda_1} \nabla \Delta (L_1 - L_w + \lambda_w N_w) =$$

$$\nabla \Delta N_1 - \frac{1}{\lambda_1} \nabla \Delta(\varepsilon_w + m_w - m_1) + \frac{1}{\lambda_1}(\alpha_1 - \alpha_w) \nabla \Delta I + \ldots ;$$

an equation in which $\alpha_1$ and $\alpha_w$ (generally $\alpha_x$) are ionospheric coefficients defined in TABLE I, in the example described.

During the third step, the combination of the carrier phase measurement error and a moderate multipath introduces another error, typically less than 0.2 cycles (see TABLE I). However, the critical problem here is the ionospheric refraction, which can also introduce errors of more than 0.5 cycles (–1.945 cycles/TECU) for short baselines.

This fundamental limitation can be overcome by calculating real-time ionospheric corrections better than 0.26 TECU (i.e., 0.5 cycles×TECU/1.9475) in order to assure the correct integer ambiguity evaluation. These corrections are introduced in step 4, which will now be described.

Step 4:

In order to overcome the problem that arises in the third step (i.e., in order to determine the ambiguities of the shortest wavelengths), a real-time model is determined in order to estimate the differential ionospheric refraction. This model is calculated from dual-frequency carrier phase data at fixed locations in a network of reference stations. It is assumed that a description of the ionospheric region passed through by the satellite-transmitted radio wave radiation is thus produced. The data of this model are combined in a known way with data derived from a simultaneous geodetic calculation, the latter advantageously being able to be performed by one of the fixed ground stations in the network, called a "master" station. The main advantage of this technique is that it makes it possible to estimate the differential refraction with a typical error of less than 0.25 TECU, even at distances of hundreds of kilometers from the nearest reference site and under varied ionospheric conditions. This precision typically involves errors of less than 0.5 cycles in the instantaneous determination of $L_1$ ambiguity for medium and long distances.

The ionospheric distribution of free electrons can be approximately determined by a grid of resolution volume units, or "voxels," wherein the electron density in an "Earth Centered Inertial" (or "ECI") system is presumed to be constant at a given moment.

A typical setup of this type is described in FIG. 1A. This FIG. 1A schematically illustrates a meridian cross-section of voxels $Vox_{ijk}$, (i, j, k being coordinate subscripts for longitude, latitude and altitude, respectively), in which the ionospheric electron density distribution is broken down according to equation (7), so as to determine the data of a real-time ionospheric model.

In this FIG. 1A, the earth GT is shown in partial cross-section, surrounded by the ionospheric layer $C_{ION}$, which has been arbitrary subdivided into two intermediate layers $C_{i1}$ and $C_{i2}$, respectively. The low altitude of the layer $C_{i1}$ is 60 km in the example described, and its high altitude is 740 km. The low altitude of the layer $C_{i2}$ is 740 km, and its high altitude is 1420 km. The angular surfaces of the voxels $Vox_{ijk}$ are 5×2 degrees each.

By way of illustration, we have represented satellites $SAT_1$ through $SAT_n$ (three of which are shown in the figures), in which "GPS" transmitters, $GPS_{E1}$ through $GPS_{En}$, respectively, are installed. These satellites $SAT_1$ through $SAT_n$ are in view of all or some of the ground stations, for example the three fixed reference stations $ST_1$ through $ST_M$ represented in FIG. 1A, which include "GPS" receivers $GPS_{R1}$ through $GPS_{Rn}$, and integrated calculating means (not represented).

Figure 1B:
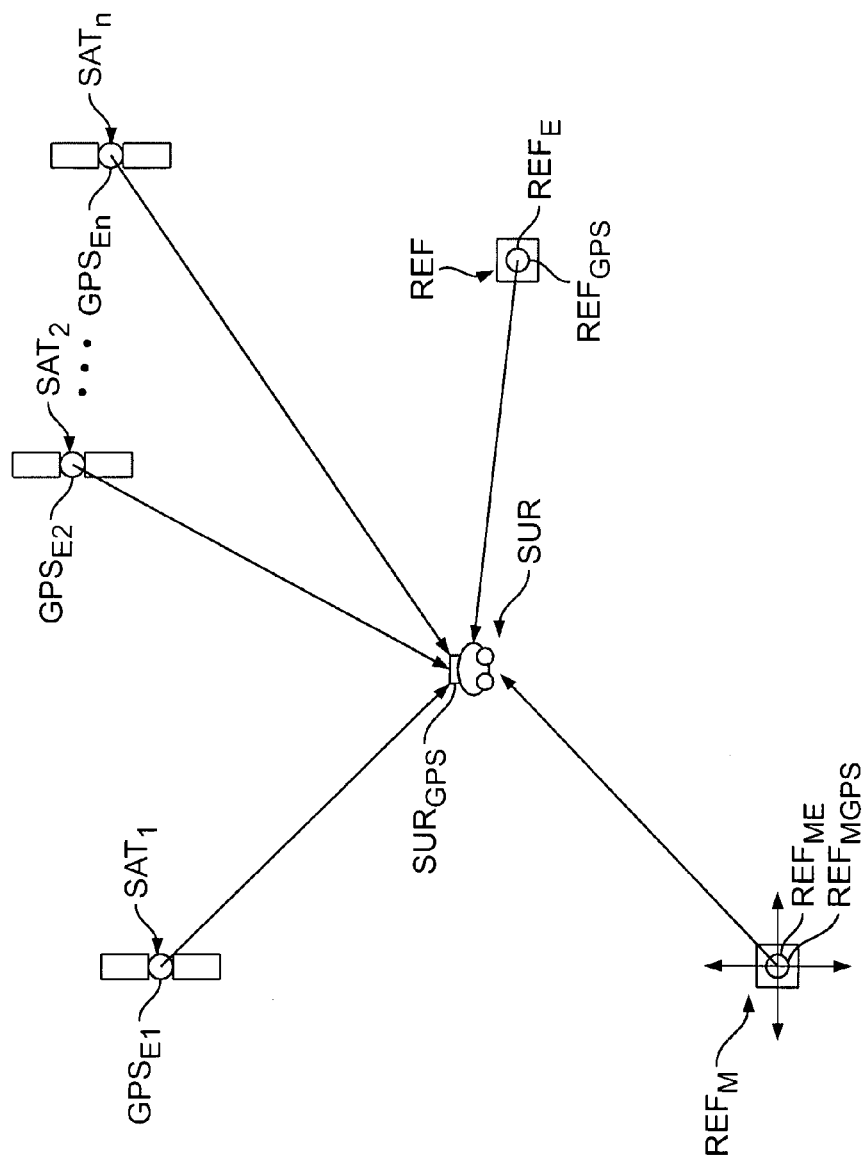
FIG. 1B schematically illustrates the architecture of a complete navigation system for implementing the method of the invention, seen from a "GPS" receiver of a rover.

FIG. 1B schematically represents the architecture of a complete navigation system according to the invention, seen from the rover SUR.

This system requires a computer, interfaces, and physical resources similar to those in certain currently deployed systems, such as EGNOS or WAAS.

This system for implementing the method according to the invention includes a "GPS" receiver, $SUR_{GPS}$, which receives the signals transmitted by satellites, for example the satellites $SAT_1$ through $SAT_n$ in FIG. 1A. From these three-frequency band signals, the three steps of the "TCAR" method are performed as indicated above using integrated calculating means (not represented).

It also receives the data signals from the real-time ionospheric model determined by the reference station REF (the nearest of the stations in the network of fixed ground reference stations $ST_1$ through $ST_M$ of FIG. 1A) from signals received from the satellites $SAT_1$-$GPS_{E1}$ through $SAT_n$-$GPS_{En}$ using a "GPS" receiver, $REF_{GPS}$. The station REF transmits the data from the model to the rover SUR using a transmitter $REF_{E1}$.

Geodetic configuration data, which can be determined in a single, so-called master station $REF_M$, are transmitted by its transmitter $REF_{ME}$ and distributed to the rover SUR to be combined with the data from the ionospheric model. As a rule, this station also has a "GPS" receiver $REFM_{GPS}$, as do the other fixed ground reference stations. The geodetic configuration data are calculated simultaneously with the data of the geodetic model.

In a way that is well known, the ionospheric determination can be obtained by resolving in real time, using a Kalman filter, the average electron density $N_e$ of each illuminated cell i, j, and k (i, j, and k being coordinate subscripts for three dimensions, as defined above), treated like a random propagation process, and with a typical process noise of $10^9$ to $10^{10}$ electrons/m3/$\sqrt{hour}$. To give a nonlimiting example, a process using a Kalman filter is described in the book by G. J. BERMAN entitled "Factorization Methods for Discrete Sequential Estimation," published in *Mathematics in Science and Engineering*, Vol. 128, Academic Press, New York, 1977.

According to an important characteristic of the method of the invention, only the carrier phase data are used. Thus, "pseudorange" code noise and multipaths are avoided. The carrier phase polarizations $B_1$ (constant in each continuous arc of carrier phase data for each satellite-receiver pair) are estimated simultaneously, as random variables (which become random white noise processes when a cycle slip occurs). In the filter, the polarizations are decorrelated in real time from the electron density values, inasmuch as the satellite geometry changes and the variations of the two types of unknowns have become smaller, as shown in equation (7) below, which represents the model for given ionospheric information between a "GNSS" satellite-receiver pair, $L_1$ and $L_2$ being the carrier phases expressed in units of length, $L_i=L_1-L_2$, and $N_e$ being the electron density). $L_1$ is given by the following equation:

$$L_I = STEC + B_I = \int_{REC}^{SAT} N_e \, dl + B_I = \sum_i \sum_j \sum_k (N_e)_{i,j,k} \Delta s_{i,j,k} + B_I; \quad (7)$$

an equation wherein the values "REC" and "SAT" relate to a GPS receiver and a satellite, respectively, of a "receiver-satellite" pair, dl is an elementary distance on the line of sight linking this pair, and $\Delta s_{i,j,k}$ is an elementary coordinate surface of the STEC, i, j, and k being coordinate subscripts for three dimensions, as defined above.

This approach is particularly suitable for detecting the local characteristics of the electron density distribution, and the use of two layers with ground data from a Global Navigation Satellite System (abbreviated "GNSS") instead of a single layer as in the usual methods, significantly reduces the risk of a bad modeling of the electron content.

In the case of "WADGNSS" ("Wide Area Differential GNSS") networks, it is possible, from the content of these real-time corrections of the slant total electron content, or "STEC" obtained through equation (7):

first, to form the station-satellite double difference $\nabla\Delta$STEC, with an error of less than 1 TECU, and to obtain a second (i.e., "wide lane") ambiguity in the reference stations; and secondly, to interpolate, in the rover's receiver, the unambiguous value $L_1$, i.e., a very precise value of $\nabla\Delta$STEC at a level of a few hundredths of a TECU, a value obtained after the resolution of the ambiguities.

If the interpolated value is better than 0.26 TECU, then the rover's receiver can resolve both ambiguities in real time.

This method is intrinsically similar to the so-called "WARTK" method, published in the aforementioned article by Hernández-Pajares et al. (2000). The results obtained so far with the "WARTK" technique, in various experiments, are summarized in another article by Hernández-Pajares et al., entitled "Tomographic Modeling of GNSS Ionospheric Corrections: Assessment and Real-Time Applications," published in "ION GPS 2001," September, 2001. It would be worthwhile to refer to these two articles for a more detailed description of this method.

In the kinematic utilization of this method, one of the most important limitations is the existence of local ionospheric irregularities, such as propagating ionospheric disturbances, or "TID" (for "Traveling Ionospheric Disturbances"), which can produce incorrect results when using a linear interpolation of the ionospheric corrections between the reference stations in the network. Performance can be improved by incorporating dual-frequency data from the rover.

Furthermore, in the case of the calculation in the reference station, long distances and strong electron content gradients can also limit the performance of the technique. For this reason, according to a characteristic of the method of the invention, an additional procedure was developed in order to include the case of permanent and/or reference stations separated by thousands of kilometers, using a so-called smoothed "wide lane" code, so as to improve the ionospheric model and consequently create an aid for real-time ambiguity determination. Such a procedure is described, for example, in the article by Hernández-Pajares et al. entitled "Improving the Real-Time Ionospheric Determination from GPS Sites at Very Long Distances Over the Equator," published in *Journal of Geophysical Research*, 2002.

However, the methods used in the prior art to resolve, in real time, the ambiguity in the receiver of a rover using a dual-frequency "GPS" system requires a large number of geodetic calculations in order to guarantee a relatively good position determination, on the level of twenty or so centimeters, to resolve free-floating ionospheric polarization combinations, and hence to be able (using the aforementioned "WARTK" method) to resolve the ambiguities in real time, after a convergence time on the order of a few minutes.

The invention makes it possible to overcome the deficiencies of the prior art, particularly as revealed by the "WARTK" method. It makes it possible to improve the instantaneous methods for resolving three-carrier phase ambiguities at medium and long distances between reference stations (ranging from tens to hundreds of kilometers), and with a minimal number of geodetic calculations. The main improvement lies in the third step of the aforementioned "TCAR" method, using real-time ionospheric corrections supplied by an ionospheric model calculated continuously in the reference stations.

An additional improvement of the aforementioned step is also implemented in the method of the invention. This improvement consists in the use of three different pseudo-range codes, hereinafter called $P_1$, $P_2$, $P_3$, instead of a single code element, which makes it possible to reduce the multi-path effect in the resolution of "extra-wide lane" ambiguity.

In addition, in a preferred embodiment, an integrity test is performed using the pseudorange, "wide lane," and $L_1$ frequency band codes to detect jumps in the ambiguity evaluation associated with an error in the ambiguity resolution of the longest wavelength. In essence, during the aforementioned second and third steps, it is easy to see from equations (5) and (6) that one cycle in the "extra wide lane" ambiguity error produces approximately eight cycles of "wide lane" error, and one cycle of "wide lane" error translates into approximately four cycles of $L_1$ error , $L_1$ being the carrier with the shortest wavelength in the example described. Often, these jumps in the ambiguity evaluation are large enough to be detected and filtered using the corresponding codes.

This approach according to the invention makes it possible to directly overcome the chief limitations that make a navigation with a typical error of less than a few centimeters impossible over long distances (more than 100 kilometers).

TABLE II, located at the end of the present specification, summarizes the compared characteristics of the main methods for real-time ambiguity resolution in the prior art ("TCAR," "ITCAR," "WARTK") and according to the invention.

To better illustrate the chief characteristics of the method according to the invention, we will now describe an exemplary experiment performed on the basis of several data sets supplied by modified signal generators installed aboard satellites in an existing system of the aforementioned "GNSS" type, with simulation of aircraft, roving "surface" users (land vehicles, for example) or fixed sites. Various dynamic and ionospheric conditions were taken into consideration.

By way of illustration and in order to provide a meaningful example, the real-time resolution of the ambiguity of a surface vehicle's receiver, hereinafter called a rover SUR, was studied in detail relative to a fixed reference station, hereinafter called REF, separated from the rover SUR by approximately 129 km, in various scenarios. In the example described, two "GPS" carriers (1575.42 and 1227.60 MHz, respectively), and the 24-channel carrier of the "GLO-NASS" system, with a frequency of 1615.50 MHz, constitute the three frequencies adopted by a simulator of the "GNSS" system, for four satellites in view for 20 minutes at 1 Hz, using the twelve available channels of a validated receiver of the type known as "AGGA" (for "Advanced GPS/GLONASS ASIC"). "AGGA" is a digital integrated circuit that allows high-speed digital signal processing for space applications such as radio occultations of "DNSS" system signals and low-earth orbit determinations. This circuit is based on an "ASIC" (or "Application Specific Integrated Circuit") standard, (an ATMEL T7905E component in the example described). "GLONASS" ("Global Orbiting Navigation Satellite System") is a Russian satellite navigation system that is comparable to the "GPS" system.

Two basic data sets were considered in the example described, hereinafter referenced "P5-M0," a set associated with maximum signal power and no multipaths, which constitutes an ideal case, and "P3-M1," a set associated with average power and multipaths.

In addition to the reference station receivers simulated in the data sets, three more stations existing in the "IGS" (for "International GPS Service") network, at distances of more than 200 km, were added just for the ionospheric calculation, which made it possible to emulate a more realistic situation comprising a larger network of fixed sites.

We will now show the results of a detailed study for the most difficult case, i.e., the longest baseline of the "rover SUR—station REF" pair, or approximately 129 km. The reference station REF is one of the stations $ST_1$ through $ST_M$ in FIG. 1A.

Figure 2:
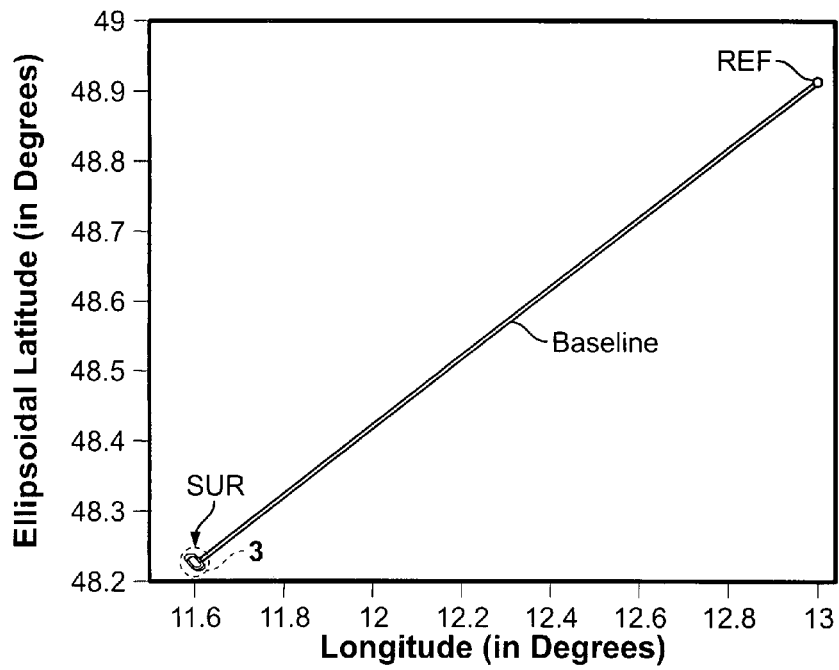
FIG. 2 schematically represents the baseline and the positions of a ground reference station and a rover, relative to the same coordinate axes.

FIG. 2 illustrates this example and represents the baseline and the positions of the station REF and the rover SUR relative to coordinate axes, ellipsoidal latitude and longitude, graduated in degrees.

Figure 3:
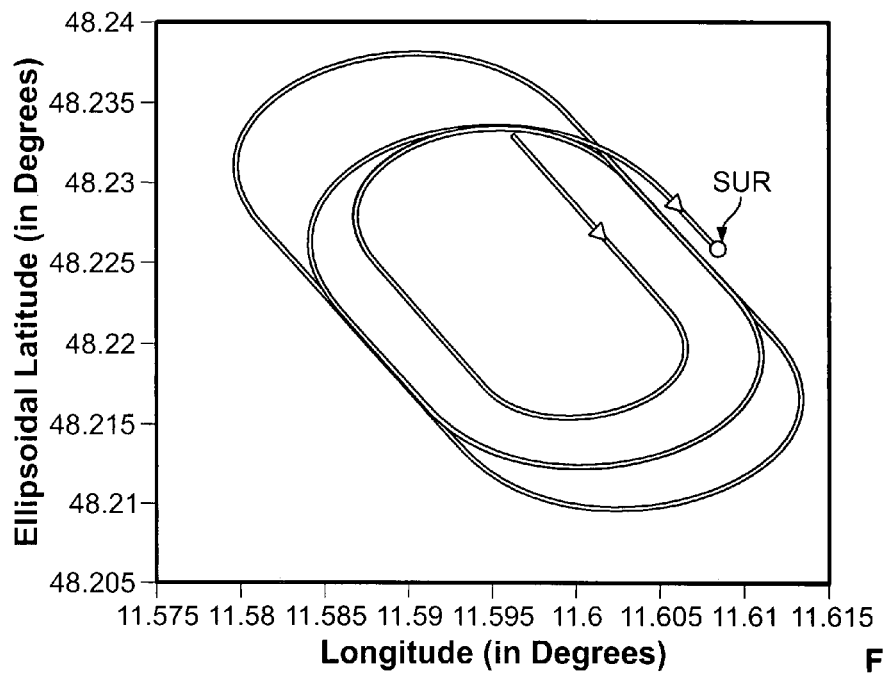
FIG. 3 is an enlargement (zoom) of FIG. 2 showing the trajectory of the rover relative to these same coordinate axes.

FIG. 3 is an enlargement (zoom) of FIG. 2 showing the trajectory of the rover SUR, again relative to coordinate axes, ellipsoidal latitude and longitude, graduated in degrees.

Figure 4:
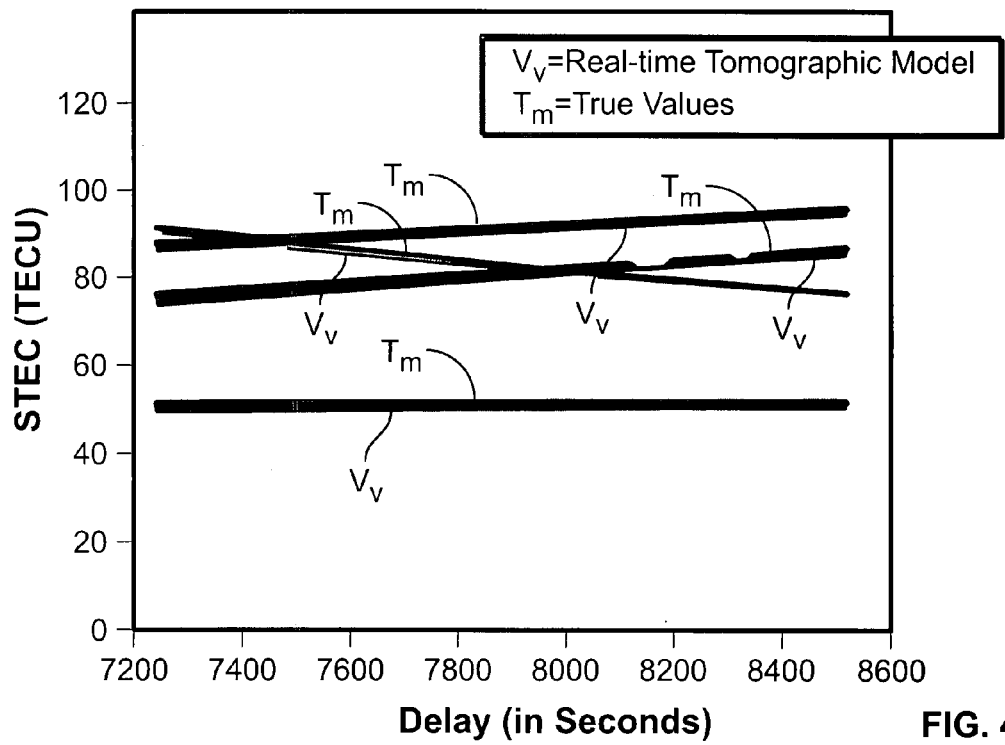
FIG. 4 is a graph illustrating examples of delays estimated from a real-time ionospheric model according to the invention compared to real ionospheric delays.

The first aspect of the results is referenced in terms of the real-time performance of the ionospheric filter. Examples of estimated delays from the real-time ionospheric model, referenced Tm in the graph, as compared to the real ionospheric delays, referenced Vv, are represented in FIG. 4. These values correspond to measurements from an experiment performed to show the capabilities of the method according to the invention.

Figure 5:
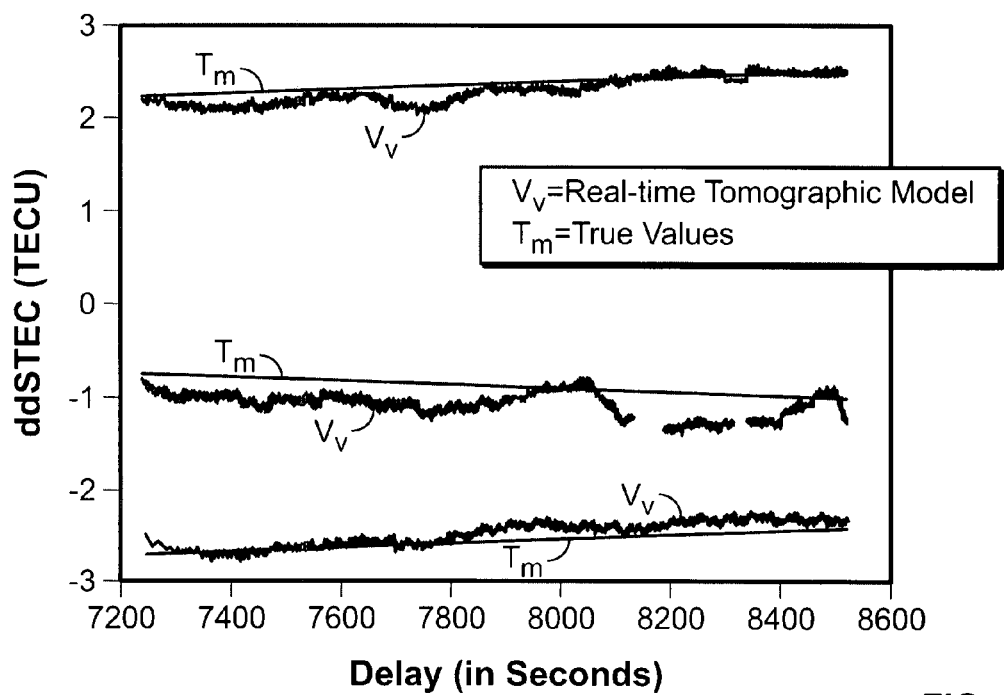
FIG. 5 is a graph illustrating examples of double differences of "Slant Total Electron Content" ("STEC") estimated in real time with a descriptive model of the ionosphere, compared to real values.
Figure 6:
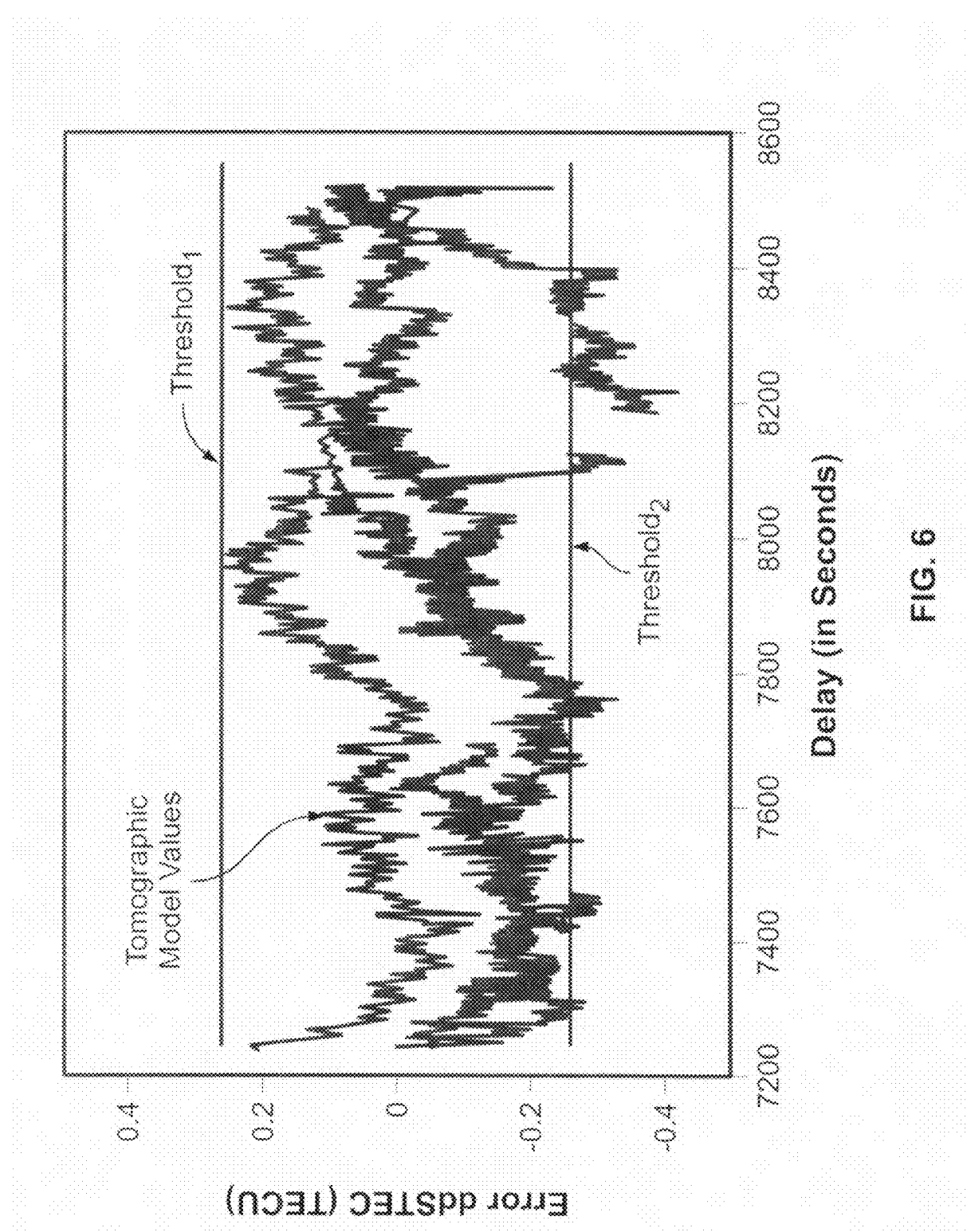
FIG. 6 is a graph illustrating examples of errors in the determination of the real-time ionospheric model of the double difference of "STEC" compared to two ionospheric thresholds.

Also, parameters that are more important for precise navigation, the values and the differences (i.e., the errors) between the estimated double differences of "STEC", $\nabla\Delta\hat{I}$ for the rover SUR, and their real values, $\nabla\Delta I$, are shown in FIGS. 5 and 6 (on the ordinate, expressed in TECU; the abscissa representing delays in seconds).

More precisely, FIG. 5 illustrates the double difference of "STEC," marked "ddSTEC," estimated in real time with an ionospheric model according to one of the important aspects of the invention, compared to the true values for the receiver of the rover SUR, relative to the farthest receiver, or REF, (at a distance of approximately 129 km).

FIG. 6 illustrates the error in the determination by the real-time ionospheric model of the double difference of "STEC," again marked "ddSTEC." The real values of the ionospheric model are compared to two ionospheric thresholds, "Threshold$_1$" (+0.26 TECU) and "Threshold$_2$" (−0.26 TECU), making it possible to determine the third ambiguity $\nabla\Delta N_1$.

More than 92% of the ionospheric determinations have errors below the threshold limit of ±0.26 TECU. They are therefore precise enough to make it possible to resolve the three ambiguities in the absence of multipaths, and to not take the measurement error into account. Most of the remaining 8% of evaluations having errors of more than 0.26 TECU came from a satellite that was observed at low altitude and in a southerly direction, the direction for which the ionospheric gradients are highest. These results were slightly improved by adding to the four reference stations a fifth station performing ionospheric correction calculations for the southerly direction.

Once the real-time ionospheric corrections have been calculated and transmitted from the reference network, the steps of the method according to the invention can be performed in the rover SUR in the manner described, in order to estimate and instantaneously resolve (in "single epoch" mode) the three ambiguities per beam.

A summary of the main results of the ambiguity resolution, for the aforementioned data sets "P5-M0" and "P3-M1" respectively, is presented in the form of two TABLES, III and IV, located at the end of the present specification. The success rate of the three steps of the "TCAR" method are indicated in the following three cases:

(a) without ionospheric corrections;

(b) with corresponding ionospheric corrections from a Klobuchar ionospheric correction model, transmitted by the current "GPS" system;

(c) with corrections from a real-time ionospheric model, according to the method of the invention.

More precisely, in the example described in connection with TABLE III, the success rate (in %) is relative to a total of 3834 on-the-fly resolution tests for the "extra-wide lane," "wide lane" and $L_1$ band frequency ambiguities (respectively $\nabla\Delta N_{ew}$, $\nabla\Delta N_w$ and $\nabla\Delta N_1$) for the receiver of the rover SUR, relative to the farthest fixed site REF (at a distance of approximately 129 kilometers), and with the aforementioned ideal data set P5-M0 (maximum reception power and no multipaths).

TABLE IV is similar to TABLE III, but for the aforementioned data set P3-M1 (an average level of reception power and multipaths). The figures in parentheses indicate the success rate relative to the total number of observations.

It is easy to see, when looking at TABLES III and IV, that the method of the invention, which combines the three steps of the "TCAR" method with a step for applying a precise real-time ionospheric model, makes it possible to considerably increase the success rate of instantaneous ("single-epoch") ambiguity determination, not only in an ideal scenario (data set P5-M0: from 0 to 92%), but also in a more difficult scenario (data set "P3-M1") with multipaths (35% even using a "Klobuchar model" type of correction, whereas the success rate reaches 92% for $\nabla\Delta N_1$, with the corrections from the ionospheric model produced according to the method of the invention).

A look at TABLE IV shows that one of the important problems with the data set "P3-M1" affected by multipaths, is the lack of integrity in the ambiguity evaluations according to the "TCAR" method, $\nabla\Delta N_{ew}$ and $\nabla\Delta N_w$, with approximately 10% and 4% incorrect instantaneous determinations, respectively.

To increase the integrity, i.e. to reduce the possibility of factoring in incorrect ambiguities, in this case in the presence of a carrier phase, and to code per multipath, it is possible to use the corresponding pseudorange, "wide lane" and $L_1$ codes to try to detect potential ambiguity determination errors in the ambiguity of the previous longest wavelength in the "TCAR" approach ("extra wide lane" and "wide lane" ambiguities, respectively), errors which are amplified by a factor of 9 and 4 wavelengths in the "extra wide lane" and "wide lane," respectively, as shown in equations (5) and (6).

A summary of the corresponding results is presented in the form of two TABLES, V and VI, located at the end of the present specification, respectively using the pseudoranges and the smoothed pseudoranges to filter such important errors.

TABLE V is similar to TABLE II, but here the ambiguity resolution success rate is calculated after having been subjected to an integrity test, i.e., a comparison with the pseudorange-derived ambiguity, in order to filter the large jumps in "wide lane" and $L_1$ ambiguity, these jumps being due to previous, larger wavelength ambiguity errors. The last column indicates the availability, i.e., the percentage of the 3834 observations that pass the preceding integrity test with the pseudoranges. The figure in parentheses "*" indicates the percentages of ambiguities calculated after passage of the integrity test. As before, the figures in parenthesis indicate the success rate relative to the total number of observations.

TABLE VI is similar to TABLE III, but smoothed pseudoranges are used in place of "pure" pseudoranges to perform the integrity test.

It is easy to see that the method of the invention provides a significant improvement of approximately 20% in integrity (from 79% in TABLE IV to 91% in TABLE VI), with a relatively small reduction (16%) in availability (which goes from 100% to 84%), by using an integrity test with smoothed code. If instantaneous ("single epoch") codes are used instead, the integrity is further improved (84%), and with greater availability (90%). When using a known "GPS" transmission model of the Klobuchar type in place of the corrections from the real-time ionospheric model according to the method of the invention, there is a substantial deterioration of the results, accompanied by a near-total lack of availability.

The available data sets for the experiment just described, despite the fact that they were suitable for obtaining an instantaneous ambiguity resolution, were nevertheless very limited in determining an instantaneous ("single-epoch") position. In fact, for the experiment, there were only four available satellites in view for 20 minutes of data, so the instantaneous navigation solution for the rover SUR had to be calculated using the data set "P5-M0" without multipaths, and with a very high available signal-to-noise ratio, in order to have the use of the minimum number of four satellites for navigation. Moreover, the tropospheric delay, the evaluation of which would have required at least a fifth satellite, was omitted. Furthermore, the first interval, from approximately 7200 to 7500 seconds, was skipped over in the determination of the positioning with respect to certain carrier phase cutoff configurations, potentially due to measurement problems in the receiver during this period. On the other hand, from the point of view of the ionospheric corrections and the corresponding success rate of the ambiguity resolution, the results are practically the same as those obtained for the data set "P5-M0" (see TABLE III).

These limitations are due to the use of data sets supplied by existing systems, which have been subject to only a minimum number of adaptations. With a more realistic data set, for example supplied by six or more satellites, these important limitations on the determination of positioning will disappear. It will in fact be possible to obtain a better geometry (a geometric "DOP" or "Dilution of Precision" factor) as well as the capability to detect and filter satellites (typically none, or sometimes one) having ambiguity errors. This will be able to be done using a navigation filter or autonomous receiver surveillance algorithms.

The results corresponding to the four satellites contained in the data set P5-M0 are indicated in FIGS. 7A through 7D, which show the residuals prior to adjustment (FIG. 7A), as well as the East (FIG. 7B), North (7C) and vertical (7D) components of the instantaneous positioning error after implementing the method according to the invention, for a rover SUR approximately 129 km away from a reference station REF. The ordinates of the graphs are graduated in meters and the abscissas (delays) in seconds.

For comparison, FIGS. 8A through 8D represent corresponding data, but for real ambiguities.

Figure 7A:
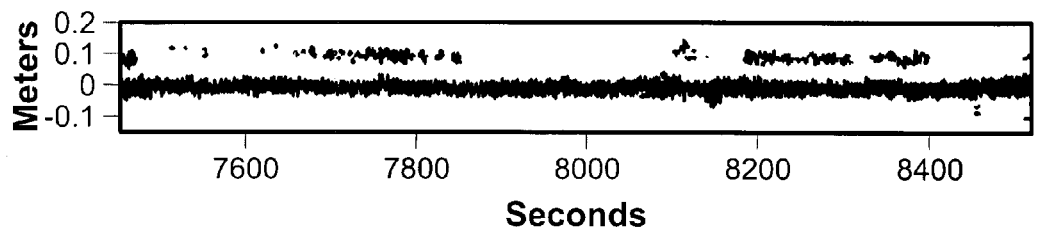
FIGS. 7A through 7D are graphs illustrating examples of estimated errors (in meters) in different navigation components.
Figure 7B:
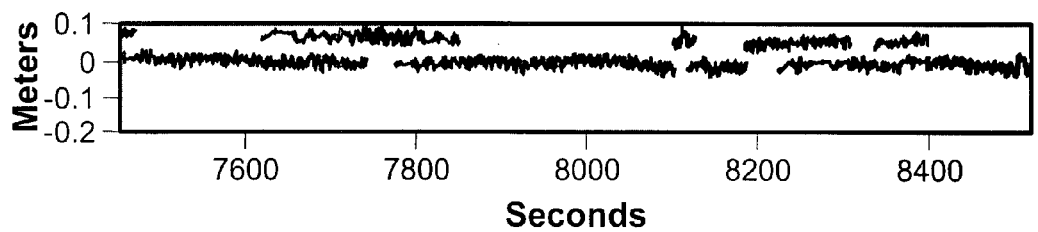
Figure 7C:
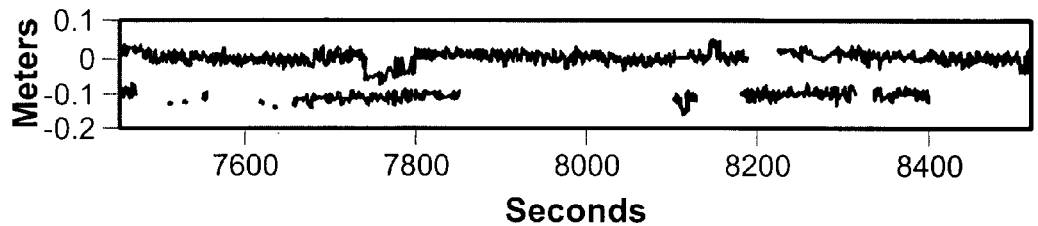
Figure 7D:
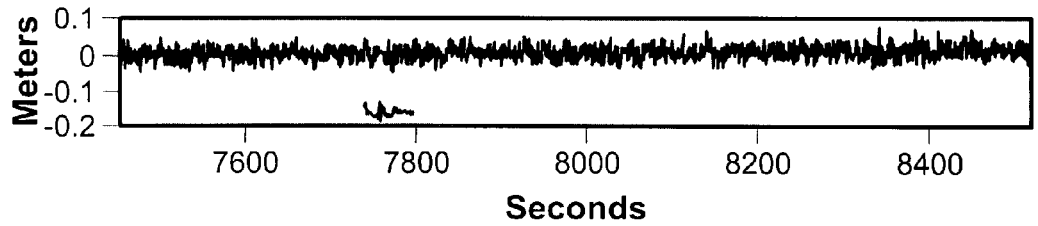
Figure 8A:
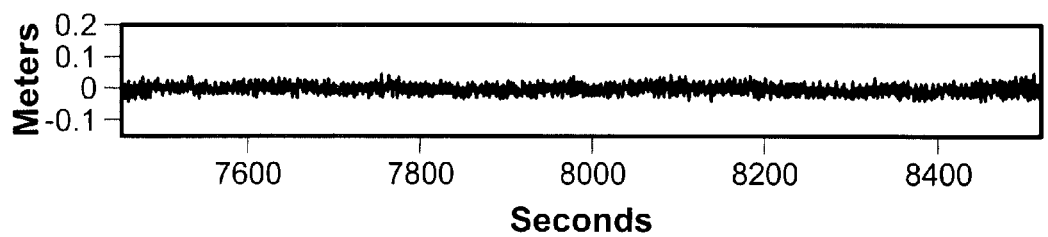
FIGS. 8A through 8D are graphs illustrating examples of real errors (in meters) in the same navigation components.
Figure 8B:
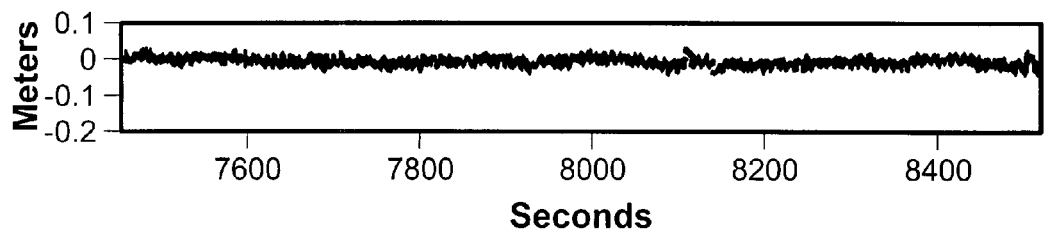
Figure 8C:
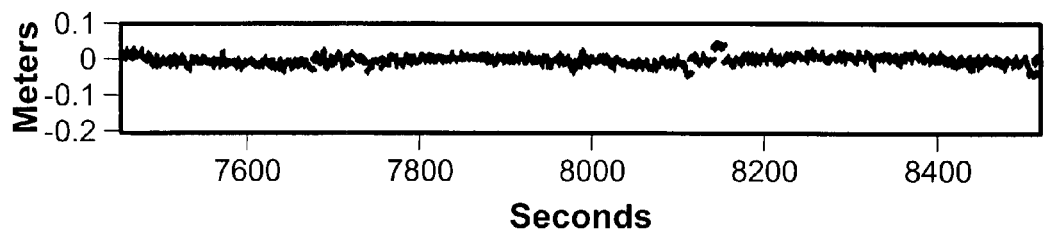
Figure 8D:
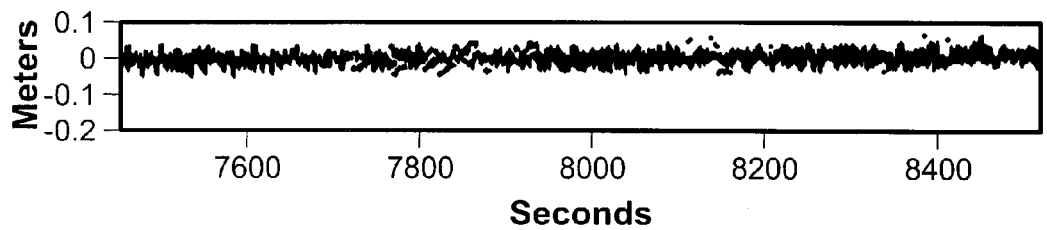

The chief characteristic of the residuals prior to adjustment $\nabla\Delta L_c$ (FIG. 7A) are errors of approximately 10 cm associated with an error of 1 cycle in $L_1$ (approximately 8%: see TABLE III), which produce ("single-epoch") navigation errors similar to jumps. They are also represented in FIGS. 7B through 7D. They are amplified by the corresponding geometric "dilution of precision" factor ("DOP"). These incorrect evaluations of $L_1$ ambiguity typically affect one double difference out of each three that are available per epoch (the minimum number for determining a positioning), so this error affects the positioning three times (approximately 24% of the epochs, with 76% of the errors in the three dimensions under 5 cm and 100% under 21 centimeters). Although the distribution of the errors is not Gaussian, the resulting effective three-dimensional values ("RMS") are 7, 3.5 and 2 centimeters, for the East, North and vertical components, respectively.

To summarize these results, "RMS" errors of 1, 1 and 2 cm are obtained for the East, North and vertical components, respectively, when the ambiguity is correctly resolved (approximately 92% of the tests and 77% of the epochs), and "RMS" errors of 3, 5 and 2 cm occur for the East, North and vertical components, respectively, when including the epochs with an incorrect ambiguity resolution.

Furthermore, the observations reduced by residual calculations, prior to adjustment, of the carrier phase double difference and the instantaneous ("single-epoch") navigation errors are represented in FIGS. 8A through 8D. A significant amplification of the carrier phase noise may be seen, particularly in the vertical component, producing an error of about 5 cm. This trajectory (with a three-dimensional "RMS" value of 3 cm, 1.1 cm and 2 cm for the North, East and vertical components, and levels of 95% at approximately 2, 2 and 4 cm, respectively) very clearly represents the solution that may be obtained using a real-time filter instead of the instantaneous ("single epoch") mode solution, after correct resolution of the ambiguities during the first epochs.

Figure 9:
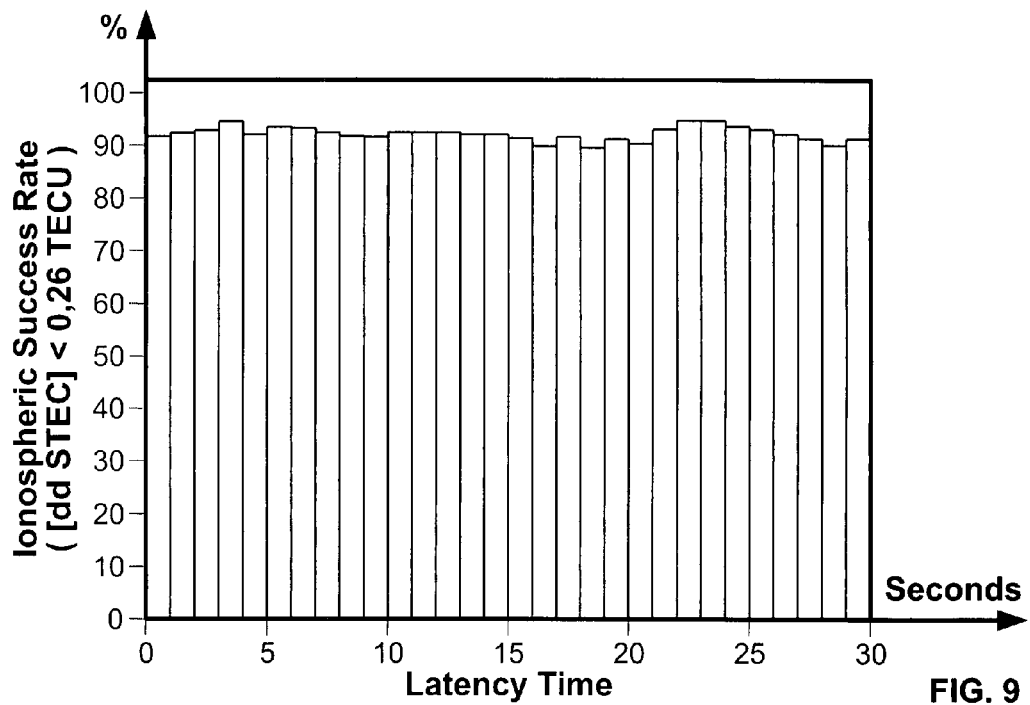
FIG. 9 is a graph illustrating an exemplary success rate for the instantaneous determination of an ionospheric double difference that is high enough to resolve all of the ambiguities (with a "TECU" better than 0.26) for corrections with latency times within a range of 1 to 30 seconds.

In order to characterize the impact of latency times in the ionospheric correction (due for example to potential problems in the communications), delays of 1 to 30 seconds (30 epochs) were considered for the ionospheric correction calculations in the network of fixed stations. For each of these delays, the success rate for a "ddSTEC" (in TECU) was calculated so as to obtain an absolute precision of 0.26 TECU for a rover at a distance of 129 km. This rate is shown in FIG. 9 as a function of the latency time (in seconds). It is easy to see that the effect of the latency time is negligible up to 30 s, with a success rate of more than 90% achieved for all the latency times.

Figure 10:
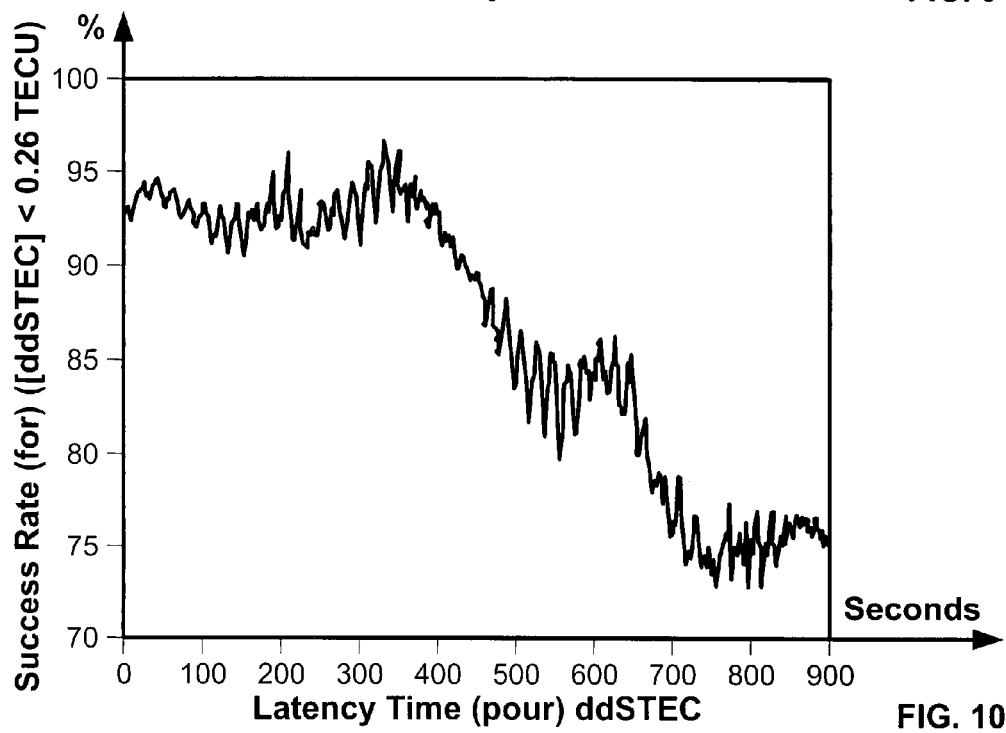
FIG. 10 is a graph illustrating an exemplary success rate in the instantaneous determination of an ionospheric double difference for corrections with latency times of up to 900 seconds.

In FIG. 10, longer latency times are considered, in this case for the reference network and rover corrections simultaneously, so that the ionospheric pierce points remain close together. It is clear that after 5 minutes, the success rate decreases from 90% to 85%. After 10 minutes, the success rate drops further, reaching 75%. These values can fall more sharply in scenarios wherein the variation in the differential ionospheric delay is even higher.

It is clear that at a middle latitude, latency time does not pose an important problem for the method according to the invention, which can support typical latency times of up to about 5 minutes.

Through the reading of the above, it is easy to see that the invention achieves the objects set forth.

The method according to the invention makes it possible, by applying real-time ionospheric corrections using a tomographic model of the ionosphere, accompanied by a minimal number of geodetic calculations, to obtain a complete instantaneous ambiguity resolution. It also allows navigation with a precision on the order of one centimeter, at distances of more than 100 kilometers from reference stations.

The preferred application of the invention will be in future satellite navigation systems such as "GALLILEO" or "Modernized GPS," which implement the transmission of carriers in three different frequency bands.

According to a chief characteristic of the method according to the invention, this capability for instantaneous navigation, with a precision better than one decimeter, is due to the fact that a three-carrier phase ambiguity resolution method of the "TCAR" type, which is not very complex, is combined with a determination of a real-time ionospheric model in order to make it possible to apply ionospheric corrections.

The exemplary experiments described in the present specification show a significant improvement of the results obtained by the methods of the prior art, under equivalent conditions:

The instantaneous ("single-epoch") success rate of approximately 60% or less is improved, increasing to approximately 90% at distances of more than 100 km from the nearest fixed ground reference station, and under conditions in which it is difficult to produce an ionospheric model (at noon at the solar maximum);

This high efficiency is maintained with latency times of approximately 5 minutes in the ionospheric corrections;

The corresponding navigation, despite the limited number of four satellites available, for the experimental conditions maintained by way of example, in the data sets, can be achieved instantaneously, in "single-epoch" mode, and makes it possible to obtain three-dimensional "RMS" values of 3, 5 and 2 centimeters for the East, North and vertical components, respectively;

In a preferred embodiment, a real-time ambiguity integrity test made it possible, insofar as a simple pseudo-range multipath reduction approach was incorporated into the method, to improve performance; and This good performance was also proven in difficult scenarios:

Low latitude (35 degrees instead of 48 degrees), with higher ionospheric values.

Extreme conditions with respect to tropical stations beneath the "Northern Equatorial Anomaly" of the ionosphere, where the highest gradients are typically produced. In the latter case, it is necessary for the user to produce its own ionospheric filter feed and combine it with the corrections from the reference networks and its own ionospheric observations.

High dynamics, making it possible to provide precise ionospheric corrections usable by an aircraft in flight at approximately 140 km from the nearest reference station.

It should be clear, however, that the invention is not limited to just the exemplary embodiments explicitly described, particularly in connection with FIGS. 1 through 8.

Finally, the numerical examples have been provided merely as an illustration, and do not constitute a limitation of any kind on the scope of the invention. They stem from a simple technological choice within the capability of one skilled in the art.

TABLE I

|  | X = 1 | X = 2 | X = 3 | X = ew | X = w |
|---|---|---|---|---|---|
| Frequency ($f_x$, MHz) | 1575.42 | 1227.6 | 1615.5 | 40.08 | 347.82 |
| Wavelength ($\lambda_x$, m) | 0.1903 | 0.2442 | 0.1856 | 7.4799 | 0.8619 |
| Phase measurement error ($\epsilon_x$, m) | ≈0.002 | ≈0.002 | ≈0.002 | ≈0.1 | ≈0.01 |
| Code measurement error ($E_x$, m) | ≈3 | ≈3 | ≈3 | ≈2.1 | ≈2.1 |
| Maximum phase multipath ($m_x$, m) | <<0.05 (≦0.01) | <<0.06 (≦0.01) | <<0.05 (≦0.01) | <<2 (≦0.5) | <<0.2 (≦0.05) |
| Maximum code multipath ($M_x$, m) | <<450 (≦10) | <<450 (≦10) | <<450 (≦10) | <<450 (≦10) | <<450 (≦10) |
| Ionospheric coefficient ($\alpha_x$, m/TECU) | −0.1623 | −0.2673 | −0.1543 | −0.2083 | −0.2031 |

TABLE II

|  | Advantages | Disadvantages |
|---|---|---|
| "TCAR" | Low computational load. | Ionospheric error, seriously limiting the resolution of the third ambiguity |
| "ITCAR" | Results improved by integrating TCAR into a navigation filter. | The ionospheric delay continues to limit the resolution of the third ambiguity. |
| "WARTK" | A precise real-time modeling; allows precise navigation at one hundred kilometers from the nearest reference station. | High computational load: a need to calculate a first ionosphere-free |

TABLE II-continued

| | Advantages | Disadvantages |
|---|---|---|
| | | solution for the rover and a significant convergence time are necessary. |
| Method according to the invention | Low computational load and precise real-time modeling of the ionosphere, allowing precise "single-epoch" navigation at distances of up to 100 km from a reference station. | |

TABLE III

| P5-M0/SUR2-REF5 (≈129 km) | Success rate $\nabla\Delta N_{ew}$ | Success rate $\nabla\Delta N_w$ | Success rate $\nabla\Delta N_1$ |
|---|---|---|---|
| Without ionospheric corrections | 100% | 100% | 0% |
| Klobuchar corrections | 100% | 100% | 33% |
| Real-time ionospheric corrections | 100% | 100% | 92% |

TABLE IV

| P5-M0/SUR2-REF5 (≈129 km) | Success rate $\nabla\Delta N_{ew}$ | Success rate $\nabla\Delta N_w$ | Success rate $\nabla\Delta N_1$ |
|---|---|---|---|
| Without ionospheric corrections | 90% | 95% (86)% | 3% (2) |
| Klobuchar corrections | 90% | 95% (87)% | 35% (31) |
| Real-time ionospheric corrections | 90% | 95% (86)% | 92% (79) |

TABLE V

| P3-M1/SUR2-REF5 (≈129 km) | Success rate $\nabla\Delta N_{ew}$-* | Success rate $\nabla\Delta N_w$* | Success rate $\nabla\Delta N_1$* | Availability |
|---|---|---|---|---|
| Without ionospheric corrections | 99% | 95% (94) | 0 (2)% | 38% |
| Klobuchar corrections | 99% | 97% (96) | 33% (32) | 38% |
| Real-time ionospheric corrections | 99% | 96% (92) | 91% (84) | 90% |

TABLE VI

| P3-M1/SUR2-REF5 (≈129 km) | Success rate $\nabla\Delta N_{ew}$* | Success rate $\nabla\Delta N_w$* | Success rate $\nabla\Delta N_1$ | Availability |
|---|---|---|---|---|
| Without ionospheric corrections | 100% | 100% (100) | 0% (0) | 0.002% |
| Klobuchar corrections | 100% | 100% (100) | 37% (37) | 0.002% |
| Real-time ionospheric corrections | 100% | 100% (100) | 91% (91) | 84% |

The invention claimed is:

1. Method for real-time navigation using three-carrier radio signals of first, second and third different frequencies that increase in value from said first to said third carrier frequency, to determine the position of a rover, said radio signals being transmitted by a given number of transmitters installed aboard satellites orbiting around the Earth and in view of said rover, said signals being received by a receiver associated with said rover and a receiver associated with at least one ground station among a plurality of fixed ground stations called reference stations, said radio signals passing through an ionospheric layer of the atmosphere surrounding said earth and experiencing disturbances that generate phase ambiguities in said carriers, the method comprising the steps of:

determining, in said rover, an extra-wide lane ambiguity of the phase differences between third and second carriers, from a combination of pseudoranges using a single code value;

estimating, in said rover, a wide lane ambiguity of the phase differences between first and second carriers, from said extra-wide lane ambiguity;

determining, in said rover, ambiguity resolution of one of said carrier frequencies from said wide lane ambiguity; and applying real-time ionospheric corrections during the resolving step, said ionospheric collections being based on a continuously updated real-time ionospheric model of said ionspheric layer.

2. Method of claim 1, wherein the step of resolving comprises the step of performing said ambiguity resolution is on said first carrier frequency.

3. Method of claim 1, wherein said model is a descriptive ionospheric model of said ionospheric layer, determined by at least one of said ground reference stations receiving signals transmitted by a predetermined number of said satellites orbiting around the Earth, said signals comprising at least two carriers of different frequencies; and the method further comprising the steps of delivering said model from phase data from said transmitted signals and transmitting data corresponding to said ionospheric model.

4. Method of claim 3, wherein said ionospheric model determination is obtained from the estimate of the free electron distribution in said ionospheric layer, in that this estimation being performed approximately by breaking down the ionospheric layer into a grid of resolution volume units called "voxels," illuminated by the radio radiation of said signals propagating in said ionospheric layer, in which the ionospheric electron density distribution is presumed to be constant at a given moment, and in that said determination is obtained through real-time resolution of the average electron density in each of said volume units illuminated by said radio radiation using a so-called Kalman filter.

5. Method of claim 4, further comprising the step of combining data associated with said ionospheric model with geodetic data calculated simultaneously, and wherein said geodetic data are calculated by only one of said fixed ground reference stations references to as a master station, and distributed to said plurality of fixed ground reference stations.

6. Method of claim 1, further comprising the step using three pseudorange codes, associated with said three carriers, during the step of determining said extra-wide lane ambiguity.

7. Method of claim 1, further comprising the step of performing an integrity test using pseudorange codes, wide lane codes and a code of said second carrier frequency to detect jumps associated with an error in said ambiguity resolution of said first carrier frequency.

8. A satellite navigation system for implementing the method according to any of the preceding claims, comprising:
- a plurality of satellites orbiting around the Earth, each of the satellites transmitting said three-carrier signals of different frequencies;
- at least one rover comprising:
  - a receiver for receiving said three-carrier signals from said plurality of satellites; and
  - integrated calculation means for performing determining an extra-wide lane ambiguity of the phase differences between said third and second carriers from a combination of pseudoranges using a single code value, estimating a wide lane ambiguity of the phase differences between said first and second carriers from said extra-wide lane ambiguity, determining ambiguity resolution of one of said carrier frequencies from said wide lane ambiguity, and integrating ionospheric corrections derived from a descriptive ionospheric model of a region of the ionosphere passed through by radio radiation of said three-carrier signals transmitted by said plurality of satellites; and
- a plurality of fixed ground reference stations, each comprising a receiver for receiving said three-carrier signals transmitted by said plurality of satellites, integrated calculation means for determining said descriptive ionospheric model of the ionospheric layer, and a transmitter for transmitting data corresponding to said ionospheric model to said receiving of said rover; and
- wherein at least one of said fixed ground reference stations is designated as a master station, said master station comprises a receiver for receiving said three-carrier signals transmitted by said plurality of satellites, means for calculating geodetic data, and a transmitter for distributing said geodetic data to said plurality of fixed ground reference stations.

9. System of claim 8, wherein said rover is located at a distance of more than 100 km from the nearest fixed ground reference station.

* * * * *